H. GALLET.
ROLLER BEARING.
APPLICATION FILED SEPT. 12, 1917.

1,257,597.

Patented Feb. 26, 1918.

Inventor.
Henri Gallet

UNITED STATES PATENT OFFICE.

HENRI GALLET, OF PUTEAUX, FRANCE, ASSIGNOR TO ETABLISSEMENTS DE DION BOUTON, SOCIÉTÉ ANONYME, OF PUTEAUX, FRANCE, A CORPORATION OF FRANCE.

ROLLER-BEARING.

1,257,597.  Specification of Letters Patent.  Patented Feb. 26, 1918.

Application filed September 12, 1917. Serial No. 190,930.

*To all whom it may concern:*

Be it known that I, HENRI GALLET, engineer, of 36 Quai National, at Puteaux, Department of the Seine, France, citizen of the French Republic, have invented certain new and useful Improvements in or Relating to Roller-Bearings; and I do hereby declare the following to be a full, clear, and exact description of the invention, such as will enable others skilled in the art to which it appertains to make and use the same.

The present invention relates to a roller bearing and refers more particularly to roller bearings for vehicle wheels. The roller bearings at present constructed have the disadvantage of making it difficult to maintain the parallelism between the various rollers, on account of the inequalities of friction exerted along a generating line of the same roller.

The invention aims to a simple construction enabling these defects to be remedied. It consists in making use of rollers of considerable length, bearing at their extremities on roller tracks and separated from one another toward their middle parts by a cage of considerable length. This cage, which embraces the rollers along a fraction of their generating lines, serves as a guide and constantly maintains the parallelism between the successive rollers in spite of the differences of friction occurring at the extremities against the roller tracks. In order to diminish the friction between the rollers and their cage, holes made oval in the radial direction, in such a way as to reduce the surfaces in contact, have been provided, having at the same time sufficient guiding.

The accompanying drawings show, by way of example, one constructional form of the invention, applied to a wheel of a vehicle.

Figure 1:
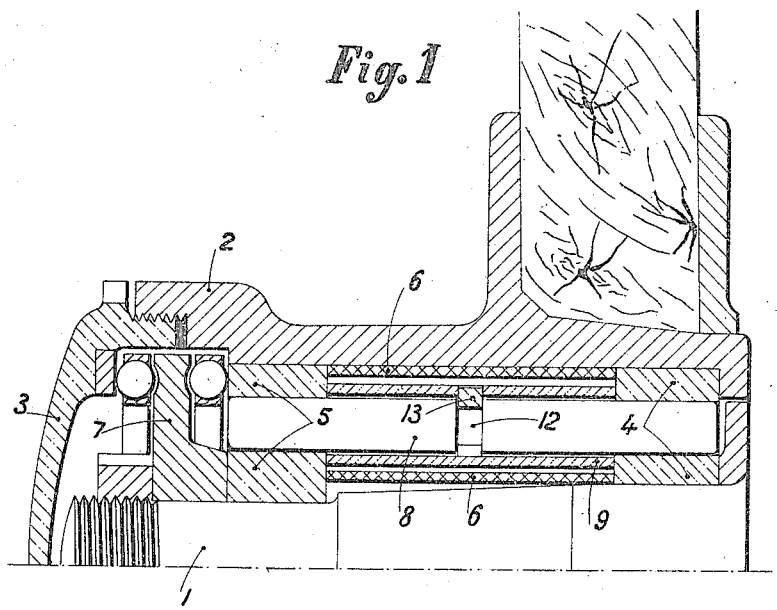
Figure 1 is a view in vertical section of the wheel and roller bearing as a whole.

The axle journal of the wheel is designated by 1, 2 represents the hub, 3 the axle-cap or plug of the hub. Between the hub 2 and the journal 1 have been arranged the roller tracks 4 and 5, each consisting of an outer race and of an inner race, stayed by tubes 6. The whole is held in place by a stop 7 in contact, on one side, with the outer race of the track 5 and, on the other side, with an annular track of the hub plug or axle-cap 3. The comparatively long rollers 8 are inserted between the tracks 4 and 5 and are in contact therewith at their extremities.

The middle part of the rollers 8 is embraced by an annular guiding cage 9 comprising a hole for each roller.

Figure 2:
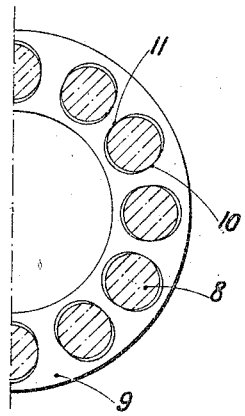
Fig. 2 is half a cross section of the cage and the rollers.

These holes are elongated in a radial direction as is apparent from Fig. 2, in such a way as only to have small rubbing surfaces 10 and 11 between the rollers and the cage, while at the same time permitting of perfect guiding on account of the contact along the generating line. The lateral guiding of the rollers is effected by means of a groove or neck 12 cut in the central parts thereof, into which enters a split ring 13 similar to a piston ring, which is threaded in the radial upper part of the cage.

Although the invention is applied to a roller bearing for vehicle wheels, it is quite understood that it is applicable to all roller bearings in general.

I claim:

1. A roller bearing comprising spaced roller tracks, relatively long rollers bearing on the tracks at their ends and a cage for guiding the rollers, said cage having holes therein through which the middle portions of the rollers pass, the holes being oval and elongated in a radial direction.

2. A roller bearing comprising spaced roller tracks, relatively long rollers bearing on the tracks at their ends, a cage for guiding the rollers, said cage having holes therein through which the middle portions of the rollers pass, the rollers having grooves therein and a ring fitted into said grooves for guiding the rollers laterally.

3. A roller bearing comprising spaced roller tracks, relatively long rollers bearing on the tracks at their ends, and a cage for guiding the rollers, said cage having holes therein through which the middle portions of the rollers pass, said holes being of sufficient size to permit the rollers to be slid longitudinally into position.

In testimony whereof I affix my signature, in presence of two witnesses.

HENRI GALLET. [L. S.]

Witnesses:
  FRANCISCO JACOMET,
  F. THOMATTALE.

Copies of this patent may be obtained for five cents each, by addressing the "Commissioner of Patents, Washington, D. C."